United States Patent [19]
Koelsch et al.

[11] Patent Number: 5,019,848
[45] Date of Patent: May 28, 1991

[54] MAGAZINE FOR A STACK OF FILM SHEETS

[75] Inventors: Michael L. Koelsch, Rochester; John De Point, Jr., Palmyra; Matthew DiPietro, Webster, all of N.Y.

[73] Assignee: Eastman Kodak Company, Rochester, N.Y.

[21] Appl. No.: 558,271

[22] Filed: Jul. 25, 1990

[51] Int. Cl.⁵ .................................................. G03B 42/04
[52] U.S. Cl. ..................................... 354/277; 378/182
[58] Field of Search ................. 354/276, 277; 378/182, 378/184, 188

[56] References Cited

U.S. PATENT DOCUMENTS

| | | | |
|---|---|---|---|
| 3,790,160 | 2/1974 | Schmidt | 271/18 R |
| 3,912,932 | 10/1975 | Matsumoto et al. | 250/468 |
| 3,934,150 | 1/1976 | Matsumoto et al. | 250/468 |
| 3,934,735 | 1/1976 | Schmidt | 214/6 D |
| 4,135,800 | 1/1979 | Weidanz et al. | 354/174 |
| 4,158,409 | 6/1979 | Duinker | 206/455 |
| 4,201,919 | 5/1980 | Schmidt | 250/468 |
| 4,303,160 | 12/1981 | Weindanz et al. | 206/455 |
| 4,531,878 | 7/1985 | Tamura | 414/412 |
| 4,537,307 | 8/1985 | Tamura | 206/455 |
| 4,555,213 | 11/1985 | Tamura et al. | 354/276 |
| 4,571,140 | 2/1986 | Yamada et al. | 414/412 |
| 4,738,366 | 4/1988 | Schmidt et al. | 206/630 |
| 4,783,019 | 11/1988 | Schmidt et al. | 242/74 |
| 4,809,313 | 2/1989 | Gandolfo | 378/182 |
| 4,853,724 | 8/1989 | Tajima et al. | 354/277 |
| 4,860,042 | 8/1989 | Tajima et al. | 354/277 |
| 4,876,706 | 10/1989 | Tajima | 378/174 |

*Primary Examiner*—Michael L. Gellner
*Attorney, Agent, or Firm*—G. Herman Childress

[57] ABSTRACT

A magazine receives a package having a stack of film sheets, such as x-ray film sheets, enclosed within a light-tight flexible bag. When the bag is positioned within the magazine and the magazine closed, the bag is cut and then removed from the magazine through is lightlock. A pair of stripper bars in the magazine are located between the lightlock and the stack of film sheets in the bag. The bars form a curved slot that enables the bag to be withdrawn through the slot while the bars block movement of the film sheets through the slot with the bag.

5 Claims, 3 Drawing Sheets

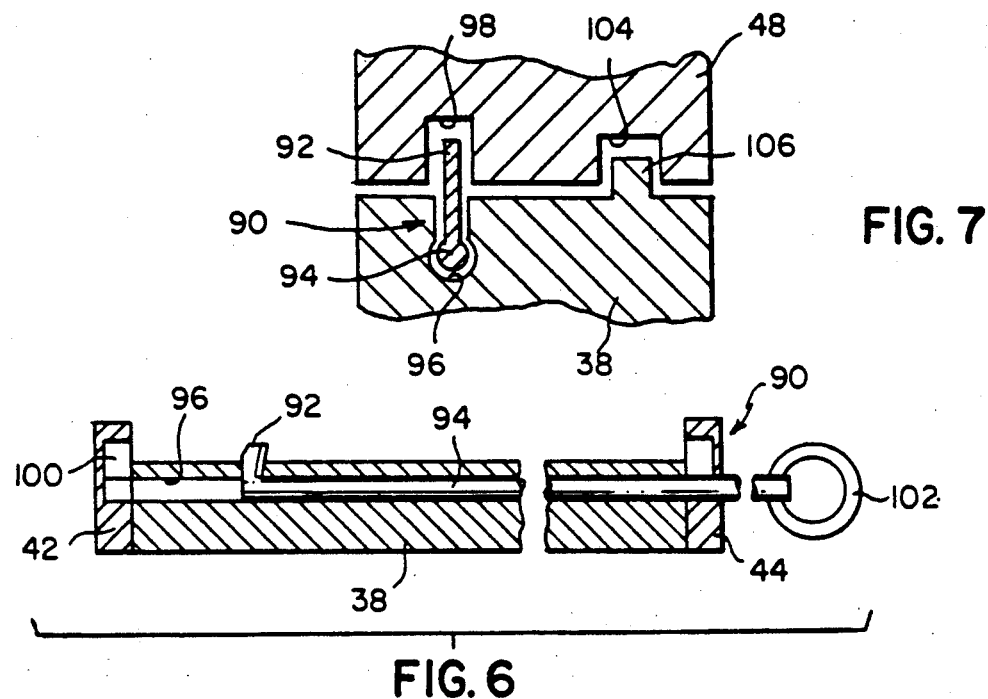
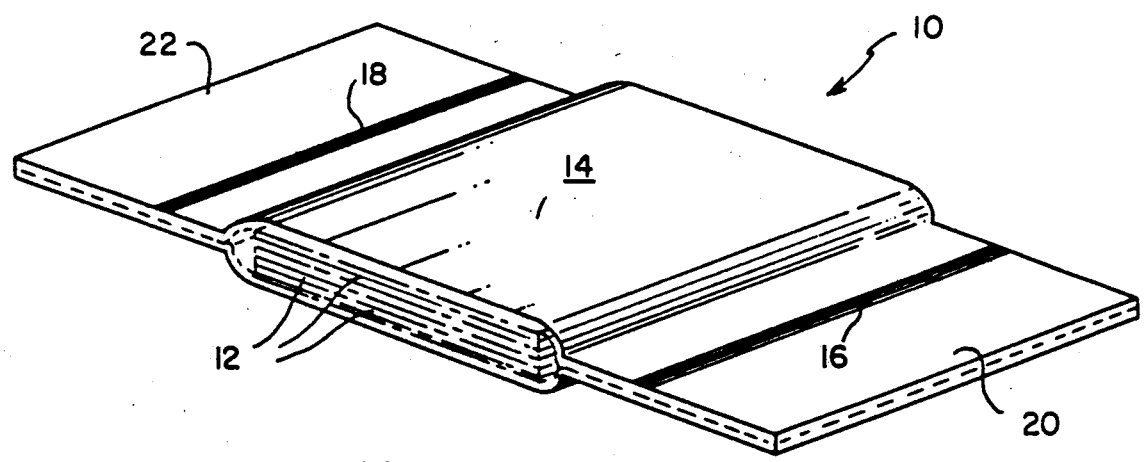

MAGAZINE FOR A STACK OF FILM SHEETS

BACKGROUND OF THE INVENTION

The present invention relates to an improved magazine of the kind used for receiving a stack of film sheets enclosed in a flexible bag and wherein the bag is removed from the sheets to enable feeding seriatim of the sheets from the magazine.

U.S. Pat. No. 4,135,800, issued Jan. 23, 1979 relates to a cassette for a stack of single film sheets, such as x-ray film sheets. The cassette is opened, an envelope containing the film sheets is inserted into the cassette, and then the cassette is closed. As the cassette is closed, cutters or knives pierce the envelope and certain of the cutters also abut against the stack of sheets to approximately position the stack of sheets in the cassette. The envelope is then pulled away from the film and through a slot forming a lightlock. As the envelope is removed, the cutters shred the envelope in a lengthwise direction, and it's possible that pieces of the envelope may not be entirely removed and could interfere with feeding of film from they cassette.

It also is known from U.S. Pat. No. 3,934,150 issued Jan. 20, 1976, to provide a sheet feeding device which receives a bag containing sheets of film and a doubling plate that fits over the front shet, back sheet and upper edge of the stack of sheets. When the bag is in the device the bag is slit at its lower end and then the bag material and doubling plate are raised to uncover the lower portions of the sheets of film so that can be removed by suction cups. The vertical orientation required for removing of the package material relative to the sheets of film may be satisfactory for the apparatus shown in such patent, but is not generally applicable to other kinds of apparatus.

When a bag containing a stack of sheets is removed from the bag, there is a tendency for sheets in the stack to be moved with the bag material. This can cause displacement of the sheets from their desired position and result in a misfeed of sheets from the magazine.

SUMMARY OF THE INVENTION

Accordingly, an object of the invention is to provide a magazine for receiving a package having a stack of film sheets enclosed within a light-tight flexible bag wherein the bag material can be removed without displacement of the sheets of film from their desired position within the magazine.

The present invention relates to a magazine that has a cutter for severing the bag and a lightlock through which the bag can be removed from the magazine after the bag has been severed by a knife. The improvement of the invention comprises a pair of stripper bars carried by the magazine and located between the lightlock and the film sheets in the package. The bars are on opposite sides of the bag and jointly define a curved slot that enables the flexible bag to pass between the bars and through the slot as it is removed from the magazine while blocking the movement of the film sheets through the slot with the bag.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 6 is a transverse section taken along line 6—6 of FIG. 2 with the upper portion of the magazine being removed for clarity;

FIG. 7 is a transverse cross section of the cutter mechanism taken along line 7—7 in FIG. 1; and FIG. 8 is a perspective view of a film package suitable for loading into the magazine of the invention.

DETAILED DESCRIPTION OF THE INVENTION

Figure 1:
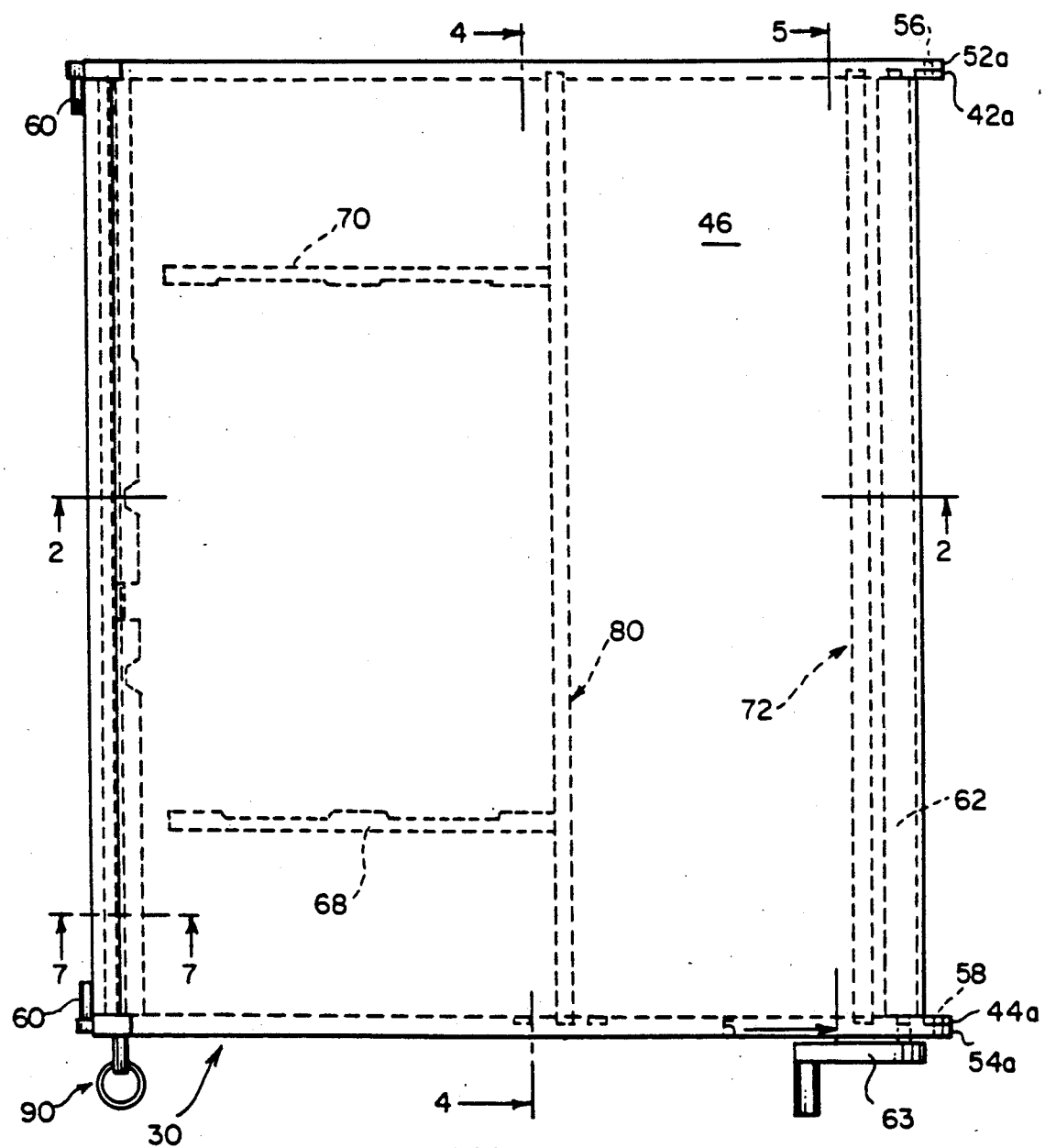
FIG. 1 is a plan view of a preferred embodiment of a magazine of the present invention.

In accordance with the present invention, a reusable, interchangeable film magazine is adapted to receive and hold a package containing a stack of film sheets enclosed within a light-tight flexible bag, and to remove the package material so that the sheets can be removed seriatim from the magazine and exposed, processed etc. Before proceeding with a description of the magazine of the invention, a package suitable for use with the magazine will be described briefly.

Referring now to FIG. 8 of the drawings, a package generally designated 10 comprises a stack of film sheets 12 enclosed within a light-tight, flexible bag 14. Film sheets 12 may comprise sheets of x-ray film, for example. Sheets 12 in a particular package 10 preferably are all the same size, however, similar film packages 10 can contain film sheets 12 of various sizes. The bag 14 can be formed from a flexible barrier wrap material which is placed around the stack of film sheets 12. The material forming the bag is heat sealed as required to form a light-tight package around the film sheets 12. Lines of heat sealing are shown at 16 and 18 in FIG. 8, and additional lines of heat sealing may be required, depending upon the manner of forming the bag 14. The heat seal line 16 is formed in a head or leading end portion 20 of the bag while heat seal line 18 is in a tail or trailing end portion 22 of the bag. Preferably the bag is formed under a vacuum so that the bag material clings tightly to the sheets 12.

Referring now to FIGS. 1-5, a magazine of the present invention is generally designated 30 and preferably comprises two portions 32,34 referred to herein as the lower portion and upper portion, respectively. The lower portion comprises a generally flat bottom 36 surrounded by a front wall 38, a rear wall 40 and two side walls 42,44, all of which project upwardly above the inner surface of bottom 36. Similarly, the upper portion 34 comprises a top or cover 46 which is surrounded by a front wall 48, a rear wall 50 and two side walls 52,54 which project downwardly from the top 46.

The front walls, rear walls and side walls of the upper and lower portions contact corresponding walls of the other portion of the magazine and jointly define with the bottom and top a space within the magazine for receiving film package 10.

Figure 2:
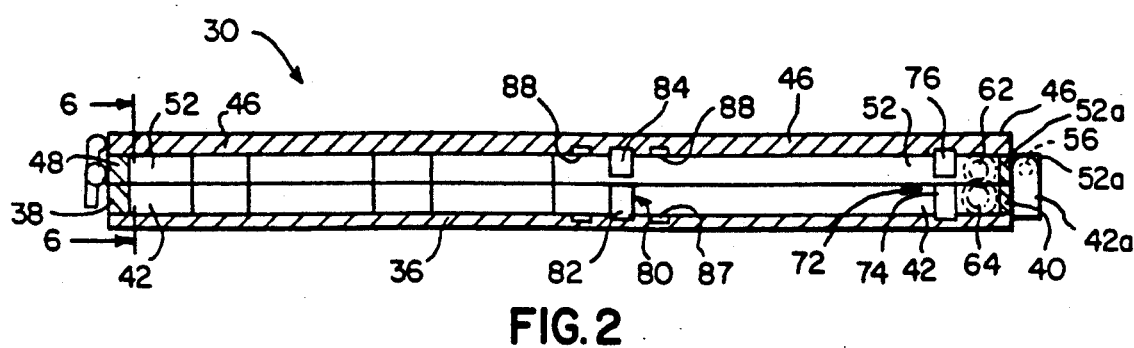
FIG. 2 is a section through the magazine taken along line 2—2 of FIG. 1.

Referring to FIGS. 1 and 2, at the rear of the magazine side wall 52 has an extension 52a that projects rearwardly, and side wall 42 has an extension 42a that projects rearwardly and upwardly so that the two extensions are in side-by-side relationship as shown in FIG. 1. A pivot 56 extends through these extensions to pivotally connect the lower portion 32 to the upper portion 34. Similarly, extensions 44a and 54a extend rearwardly beyond walls 44 and 54 with portions thereof being adjacent each other to receive a pivot 58. In this manner the upper portion 34 can be swung between a closed position shown in FIGS. 1, 2, 4 and 5 and an open position shown in FIG. 3 to enable the film package 10 to be inserted within the magazine. When the upper portion 34 is lowered to its closed position, the upper and lower portion can be latched together by suitable latch means generally designated 60 in FIGS. 1 and 2.

A gear 62 is mounted in side walls 52,54 of the upper portion of the magazine and near the rear end thereof. A similar gear 64 is mounted on the side walls 42,44 of the lower portion 32 of the magazine. Gear 62,64 mesh when the upper portion of the magazine is in its closed position, and the gears are separated when the upper portion of the magazine is in its open position. This enables the leading end portion 20 of the film package 10 to be placed between the gears when the magazine is open, as explained in more detail later. When the gears are meshed, they form a lightlock which prevents light from entering the magazine through the rear end thereof. Gears for removing a package from a magazine and for forming a lightlock are known from U.S. Pat. No. 4,571,140, for example. Gear 62 (or gear 64) can be driven by a crak handle 63, or by a motor, not shown.

A pair of locator bars 68,70 (FIG. 1) are provided inside the magazine for accurately positioning package 10 laterally within the magazine. Bars 68,70 preferably are mounted on the bottom 36 of the lower portion 32 of the magazine so that when the upper portion is moved to its open position, the package can be conveniently positioned in the lower portion 32 of the magazine. Bars 68,70 are parallel to each other and extend from near front wall 38 toward the rear wall 40. Preferably the locator bars 68,70 are adjustable to a plurality of positions so that packages containing film of various sizes can be accurately located within the magazine. This can be accomplished, for example, by providing pins on the bottom of the locator bars 68,70 and a series of holes in the bottom 36 of he magazine for receiving the pins and holding the locator bars in position.

The magazine has two sets of stripper bars through which the bag 14 is pulled in the process of removing the bag from the film and from the magazine. One set of bars, generally designated 72, comprises a lower bar 74 and and upper bar 76 that are secured to the bottom portion 32 and upper portion 34, respectively, of the magazine. When the magazine is closed the bars 74,76 are spaced slightly from each other to define a slot 78 through which the bag material 14 can be pulled. Bars 74,76 are located closely adjacent to the gears 62,64, as best illustrated in FIG. 2, and the slot 78 is approximately aligned with the nip between the gears.

Figure 4:
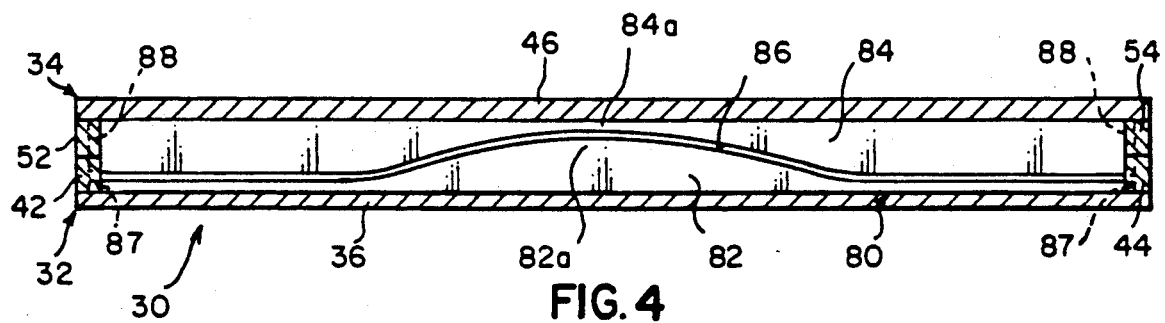
FIG. 4 is a cross section view taken generally along line 4—4 of FIG. 1 and showing the pair of stripper bars through which the package material is removed from the stack of sheets.
Figure 5:
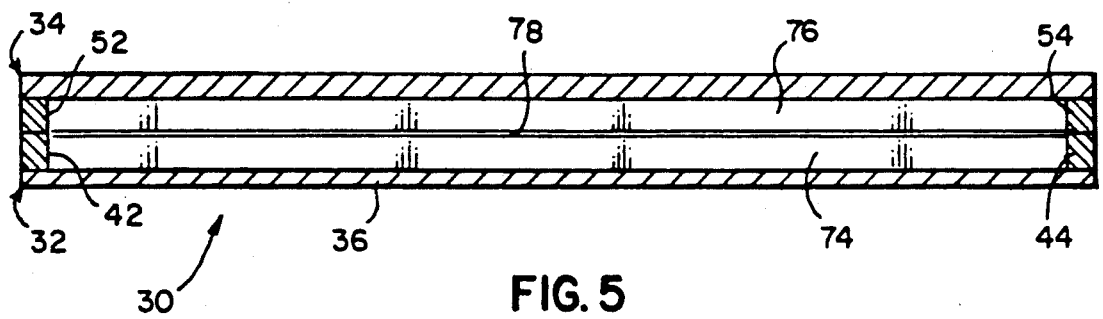
FIG. 5 is a cross section view taken along line 5—5 of FIG. 1 and showing another pair of stripper bars in the magazine.

The second set of bars is generally designated 80 and comprises a lower bar 82 carried by the lower portion 32 of the magazine and an upper bar 84 carried by the upper portion 34 of the magazine. Bars 82,84 are spaced slightly from each other to define a slot 86. Preferably bars 82,84 are shaped so that the slot 86 is curved instead of being in a straight line. Thus, as best shown in FIG. 4, bar 82 may have a portion 82a that is enlarged or raised along its central portion relative to the end portion of the bar. Similarly, the bottom of bar 84 has a complementary shape, including a portion 84a at the center that is recessed relative to the end portion of the bar, so that the adjacent portions of the bars 82,84 conform to each other and define a slot 86 of uniform width throughout its length. By curving the slot the bars are effective to block a sheet of film that may be urged toward the rear of the magazine as the bag 14 is pulled to the rear of the magazine during removal of the bag from the film. The reason that the curved slot 86 blocks movement of a sheet of film through the slot during removal of the bag is that the sheets, while flexible, are relatively rigid and have a tendency to lie in a flat plane. Thus removal of the bag does not force the film sheet into the curved shape of slot 86. The film is effectively blocked by the shape of the bars.

Preferably, the set of bars 80 is spaced from front walls 38,48 of the magazine by a distance that is slightly greater than one dimension of package 10. In order to accommodate packages 10 containing film sheets of vaious sizes, the set of bars 80 preferably are adjustable to each of several positions relative to the front walls. This is accomplished by providing a set of notches 87 in side walls 42,44 for receiving bar 82, and a similar set of notches 88 in side walls 52,54. The bars can be held in the notches by a press fit between the bars and the side walls, or fasteners (not shown) can secure the bars in the notches.

Referring now to FIGS. 1, 6 and 7, a cutter mechanism generally designated 90 is provided in the front of the magazine in walls 38 and 48 and in side walls 42 and 44 for cutting the package. The cutter mechanism comprises a knife blade 92 mounted at one end of a rod 94. Rod 94 travels along a generally cylindrical slot 96 in end wall 38 and the side walls. The top of slot 96 is open to the top of the end wall 38, as shown in FIG. 7, so that the blade an project upwardly into a slot 98 in the end wall 48. Normally the knife blade 92 is received in a recess 100 in side wall 42. however, the blade can be moved in a left to right direction as viewed in FIG. 6 by pulling on a ring 102 attached to the end of the rod opposite form the blade. Thus when a portion of the bag 10 is captured between the end walls 38,48, the ring 102 can be pulled to move the knife blade 92 to the right as viewed in FIG. 6 in order to cut the bag.

As illustrated in FIG. 7, end wall 48 has a recess 104 which extends the length of the wall 48 and faces the wall 38. An upwardly projecting rib 106 on the top of wall 38 is adapted to fit within the recess 104. The recess and rib jointly define a lightlock so that after the bag is removed from the stack of film sheets the recess and rib will jointly block entrance of light into the magazine from between the end walls 38 and 48. Similar recesses and ribs can be provided along the side edges of the upper and lower portions of the magazine to provide an lightlock.

Figure 3:
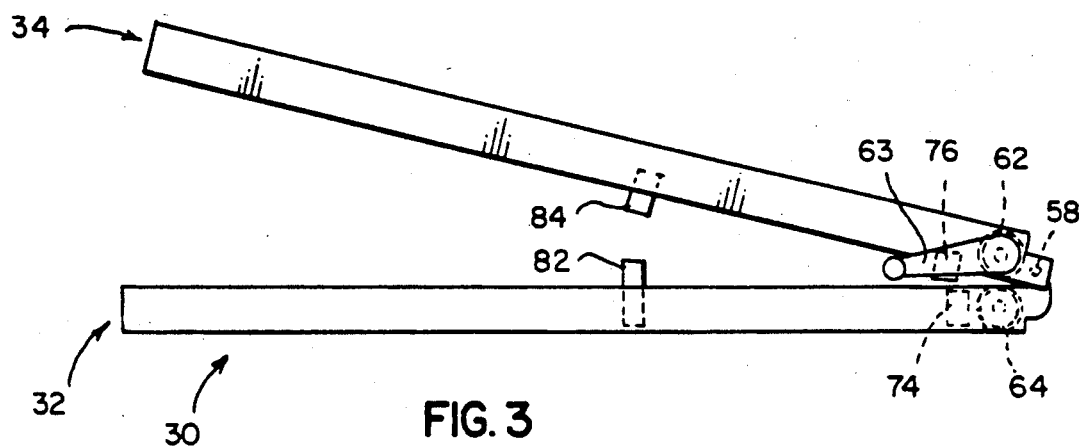
FIG. 3 is an end view from the bottom of FIG. 1 showing the magazine in an open position for receiving a package of film.

In operation, package 10 is inserted into the magazine 30 by releasing latch 60 and raising the upper portion 34 of the magazine to its open position as illustrated in FIG. 3. This separates the sets of stripper bars 72 and 80 and also separates the gears 62,64. Package 10 is placed on the bottom wall 36 of the lower magazine portion between the locator bars 68,70 and between the end wall 38 and the stripper bar 82. The leading end 20 of the package 10 is placed over the top of stripper bar 82 and over stripper bar 74, and then fed between the gears 62,64 so that it projects from the rear end of the magazine. The trailing end 22 of the package is placed over the top of end wall 38 and the heat seal 18 is to the left side of the plane of the cutter mechanism 90, as viewed in FIG. 7. Preferably, the heat seal is visible to the operator at the front end of the magazine.

With package 10 thus properly positioned within the magazine, the upper portion 34 of the magazine is moved to its closed position and the latch 60 is engaged to hold the magazine closed. When the package is being loaded, the sheets of film 12 within the package are protected from exposure by the packaging material 14, including the lines of heat sealing 16 and 18.

Next, the cutter mechanism 90 is driven from left to right as viewed in FIG. 6 to sever the package 10 between the heat seal line 18 and the sheets of film 12. This opens the left end of the package but the sheets of film are not exposed due to the lightlock formed by the recess 104 and rib 106. Next, the handle 63 is rotated to drive gear 62 in a counterclockwise direction, thereby driving gear 64 in a clockwise direction. The gears jointly pull the packaging material away from the stack of sheets 12 within the package and feed the packaging material out the rear of the magazine. As noted before, the gears 62,64 form a lightlock which prevents light from entering the magazine betwen the gears and exposing the film.

When the upper portion of the magazine 34 is moved to its closed position over a package 10 within the magazine, the leading end portion 20 of the packaging material is captured in slots 78,86 between the pairs of stripper bars 72 and 80. The slots are sufficiently wide to enable the packaging material to be fed through the slots as it is withdrawn from around the sheets of film. Friction between the packaging material and the top and bottom sheet of film 12 in the stack may urge sheets of film to the right toward the pair of bars 80. However, due to the curved shape of slot 86, the sheets of film will be trapped by the bars 82,84 and prevent it from moving through the slot 86 where they would be imsplaced within the magazine.

Once the packaging material has been removed from the sheets of film, the magazine can be loaded into an apparatus capable of opening the magazine and individually removing sheets of film, or the magazine can be used in a dark room where sheets of film are manually removed from the magazine and loaded into a cassette for exposure.

The invention has been described in detail with particular reference to a preferred embodiment thereof, but it will be understood that variations and modifications can be effected within the spirit and scope of the invention.

We claim:

1. In a magazine for receiving a package having a stack of film sheets enclosed within a light-tight flexible bag, the magazine having a cutter for severing the bag and a lightlock through which the bag can be removed from the magazine after the bag has been severed by the knife, the improvement comprising:
    a pair of stripper bars carried by the magazine and located between the lightlock and the film sheets in the package, the bars being on opposite sides of the bag and jointly defining a curved slot that enables the flexible bag to pass between the bars as it is removed from the magazine while blocking the movement of the film sheets through the slot with the bag.

2. A magazine as set forth in claim 1 wherein one of the bars has an enlarged central portion and the other bar has a complementarily shaped recessed central portion, and the bars are shaped relative to each other so that the slot is substantially the same width throughout its length.

3. A magazine as set forth in claim 2 further comprising a second pair of bars, the second pair of bars being located between the stripper bars and the lightlock, and the second pair of bars jointly defining a slot through which the bag can pass as it is removed from the magazine.

4. A magazine as set forth in claim 3 wherein the magazine comprises first and second portions, means mounting the magazine portions for pivotal movement between a closed position wherein the portions are in engagement and an open position wherein the portions are separated sufficiently to enable a package of film sheets to be positioned between the magazine portions, and one bar of each pair of bars being on the first portion of the magazine and the other bar of each pair of bars being on the second magazine portion.

5. A magazine as set forth in claim 1 further comprising means for mounting the pair of stripper bars in each of a plurality of positions within the magazine so that packages of various sizes can be accommodated.

* * * * *